(12) United States Patent
Mancuso

(10) Patent No.: US 6,325,350 B1
(45) Date of Patent: Dec. 4, 2001

(54) PENDULOUS PIVOTABLE CUP HOLDER

(75) Inventor: Salvatore Mancuso, 1283 Blueberry Hill, Brunswick, OH (US) 44212

(73) Assignee: Salvatore Mancuso, Brunswick, OH (US)

( * ) Notice: Subject to any disclaimer, the term of this patent is extended or adjusted under 35 U.S.C. 154(b) by 0 days.

(21) Appl. No.: 09/492,773

(22) Filed: Jan. 28, 2000

Related U.S. Application Data

(60) Provisional application No. 60/154,459, filed on Sep. 17, 1999.

(51) Int. Cl.[7] ....................................................... A47K 1/08
(52) U.S. Cl. ...................... 248/311.2; 224/274; 248/230.1
(58) Field of Search .................................. 248/311.2, 146, 248/128, 138, 230.1, 231.61, 231.71; 224/274, 547, 555

(56) References Cited

U.S. PATENT DOCUMENTS

| | | | |
|---|---|---|---|
| 936,104 | * | 10/1909 | Ernest .............................. 248/289.11 |
| 3,987,993 | * | 10/1976 | Hopkins ................. 248/210 |
| 4,036,463 | * | 7/1977 | Hopkins et al. ..................... 248/210 |
| 5,320,263 | * | 6/1994 | Kobylack ............................ 224/274 |
| 5,433,361 | * | 7/1995 | O'Malley ............................ 224/274 |
| 5,484,129 | * | 1/1996 | Megal ............................. 248/311.2 |
| 5,579,968 | * | 12/1996 | Staschiak ............................ 224/274 |

\* cited by examiner

*Primary Examiner*—Ramon O Ramirez
*Assistant Examiner*—Tan Le

(57) ABSTRACT

A beverage holder assembly for mounting to a framing member. The beverage holder assembly pivotably attaches to the framing member, whereby the beverage holder assembly maintains an open top liquid container, placed therein, in an upright position despite changes in the orientation of the framing member.

3 Claims, 5 Drawing Sheets

PENDULOUS PIVOTABLE CUP HOLDER

This application claims benefit to Ser. No. 60/154,459 filed Sep. 17, 1999.

FIELD OF INVENTION

The present invention relates to a beverage holder assembly and more particularly, to a pivotable beverage holder assembly for mounting to a framing member for maintaining open top liquid containers in an upright position despite changes in the orientation of the framing member.

BACKGROUND OF THE INVENTION

Golfers frequently employ the use of wheeled golf carts to transport golf clubs when playing golf. Most wheeled carts are not designed or built to support a beverage. A variety of beverage holders adapted to be attached to the wheeled golf cart are available. However, these beverage holders typically require a great number of parts, require complicated installation, and are expensive to manufacture, or do not provide the requisite stability or fail to prevent the beverage from spilling over changes in terrain. For example, U.S. Pat. No. 5,579,968 to Staschiak is directed to a beverage holder for a golf cart that includes a complex clamping portion that is difficult to install or remove. The clamping portion is made of a bracket having grooved interlocking pieces. Moreover, Stachiak employs a keyhole attachment for the beverage holder portion that is prone to detachment over rough terrain. Moreover, this particular design does not prevent theft. Loss of the beverage holder portion renders the apparatus useless.

Therefore, a need exists for an inexpensive beverage holder apparatus that is relatively simple, easily installed and can be used with all types of wheeled golf carts.

SUMMARY OF THE INVENTION

A pivotable beverage holder assembly for mounting to a framing member includes a clamp for attaching the assembly to the framing member, wherein the clamp consists of a first holder with a surface for engaging the frame member to be clamped, a second holder with a surface in opposition to the surface of the first holder, first and second tightening bolts and nuts spacedly attached to the first holder and second holder for fixedly securing the clamp to the framing member, and a pivoting arm aperture in the first holder; a shoulder bolt and nut, wherein the shoulder bolt includes a head and a shaft, wherein the shaft includes a smooth portion extending from the head and a threaded end portion; and a beverage holder portion including a cylindrical body having an open top portion and a rigid arm extending tangentially and perpendicularly from the cylindrical body, wherein the rigid arm includes an aperture at an arm end that is pivotably attached to the pivoting arm aperture of the first clamp holder with the shoulder bolt and nut, whereby the beverage holder assembly maintains open top liquid containers in an upright position despite changes in the orientation of the framing member.

In a second embodiment, the pivotable beverage holder assembly for mounting to a framing member includes an L shaped bracket including a first portion fixedly attached to the framing member and a second portion including an aperture for pivotably attaching a beverage holder portion; a shoulder bolt and nut, wherein the shoulder bolt includes a head and a shaft, wherein the shaft includes a smooth portion extending from the head and a threaded end portion; and a beverage holder portion including a cylindrical body having an open top portion and a rigid arm extending tangentially from the cylindrical body, wherein the rigid arm includes an aperture at an arm end that is pivotably attached to the pivoting arm aperture of the first clamp holder with the shoulder bolt and nut, whereby the beverage holder assembly maintains open top liquid containers in an upright position despite changes in the orientation of the framing member.

DETAILED DESCRIPTION OF THE PREFERRED EMBODIMENTS

Figure 1:
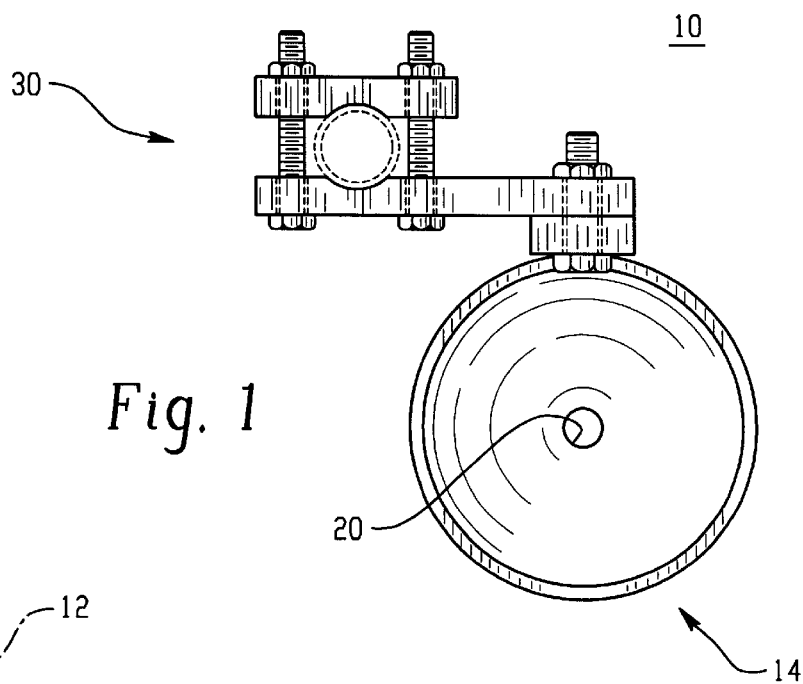
FIG. 1 illustrates a top down view of a pivotable beverage holder assembly for mounting to a framing member.

Can Caddy™ for golfers is a pivoting beverage holder assembly for mounting to a framing member, e.g., a stanchion support in a golf pull cart, designed to transport cups, travel mugs, water bottles, and cans containing liquids while maintaining an upright position during a typical round of golf. Liquids placed in such containers may be conveniently transported across hilly and irregular terrain with minimal spillage. The beverage holder assembly attaches to the stanchion of a pull-behind golf cart, enabling golfers the convenience of enjoying a beverage and avoiding the burden of carrying or placing it on the ground every time they hit the ball.

The convenience of having a place to put a beverage while pulling the golf club cart is the purpose of this invention. Golfers no longer need to be concerned with bending down and carefully placing their beverage on the ground and perhaps, spilling it while locating a level spot or picking it up. Many golfers who enjoy a beverage also spill it on themselves while walking. This may be avoided by owning one of these beverage holder assemblies. The freedom of not tying up a golfer's hands while playing and walking means less chances for spilling and getting the hands sticky from soda or coffee. A pivoting beverage holder assembly mounted to a golf cart will maintain an upright position and prevent spillage while pulling the golf cart. This unit conveniently mounts to the stanchion of the pull-behind golf cart and carries the beverage container while golfing; and collapses when the golfer transports the clubs.

Alternatively, the beverage holder apparatus may be mounted onto a baby carriage, a walk behind lawnmower, a mail cart, or the like. Once again, the Can Caddy for Golfers frees the hands while a person is walking over a variety of terrain avoiding spillage and provides a convenient place to put a beverage while in route.

Referring now to FIGS. 1–6, a beverage holder assembly, generally designated 10, for mounting to a framing member 12 is illustrated. The assembly 10 generally includes a cylindrical body 14, a pivot arm 16 and means for securely attaching the pivot arm 16 to the framing member 12. The means for securely attaching the pivot arm 16 to the framing member 12 are shown in a first embodiment in FIGS. 1–4 and in a second embodiment in FIGS. 5 and 6. The cylindrical body 14 and pivot arm 16 are the same in both embodiments, whereby common reference numerals are used for these elements throughout the several views.

Figure 2:
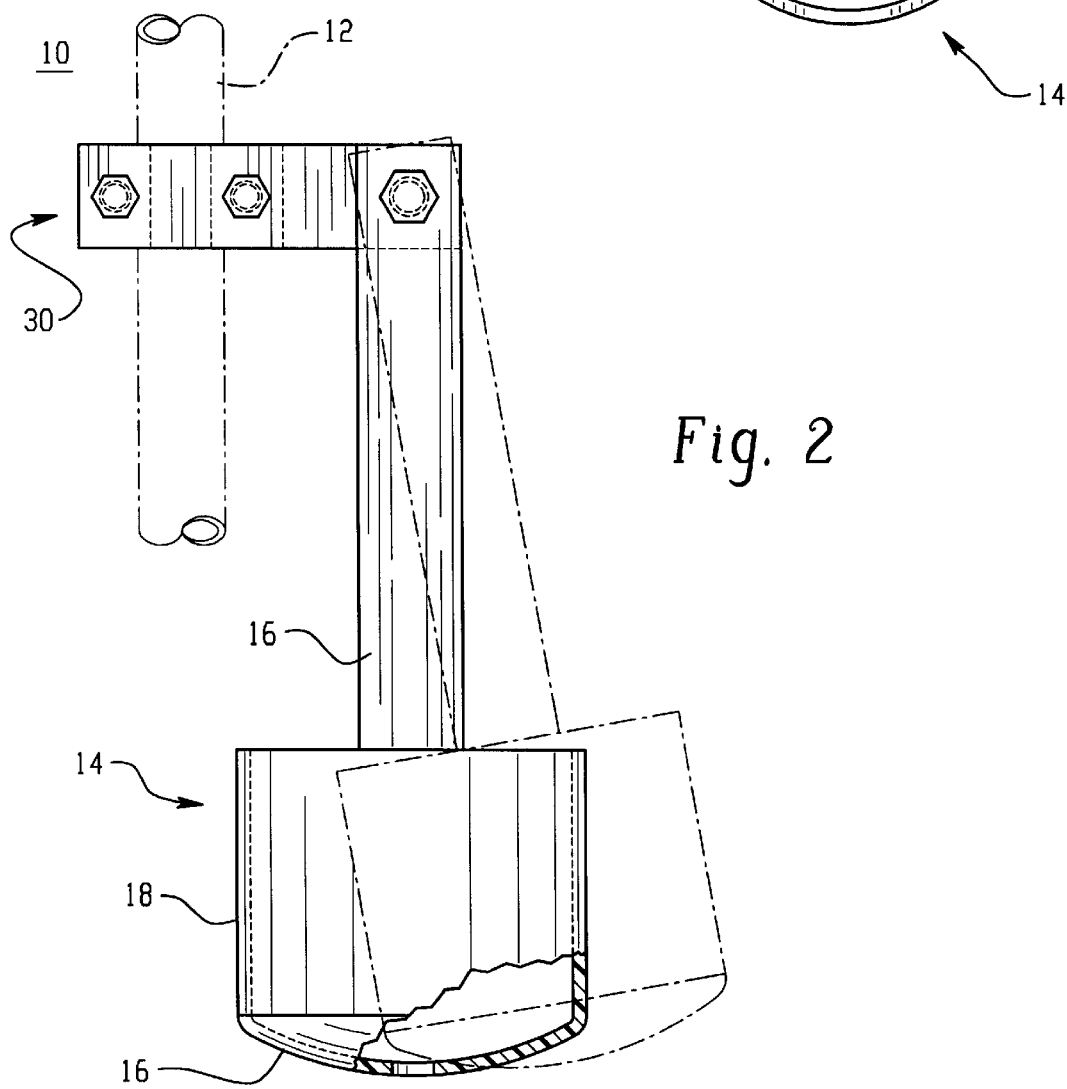
FIG. 2 is a side elevational view of a pivotable beverage holder assembly.
Figure 3:
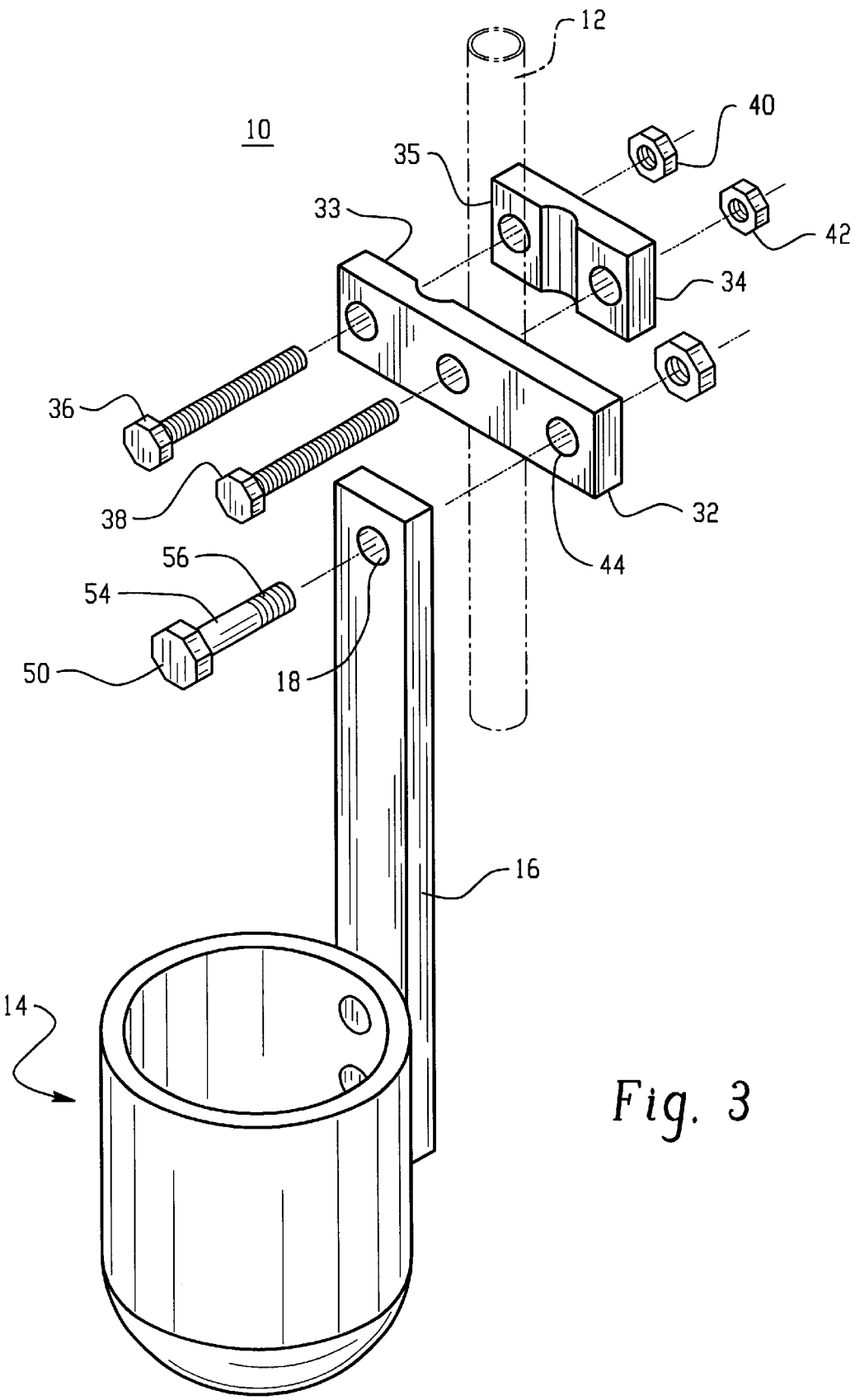
FIG. 3 is an exploded perspective view of a pivotable beverage holder assembly.
Figure 4:
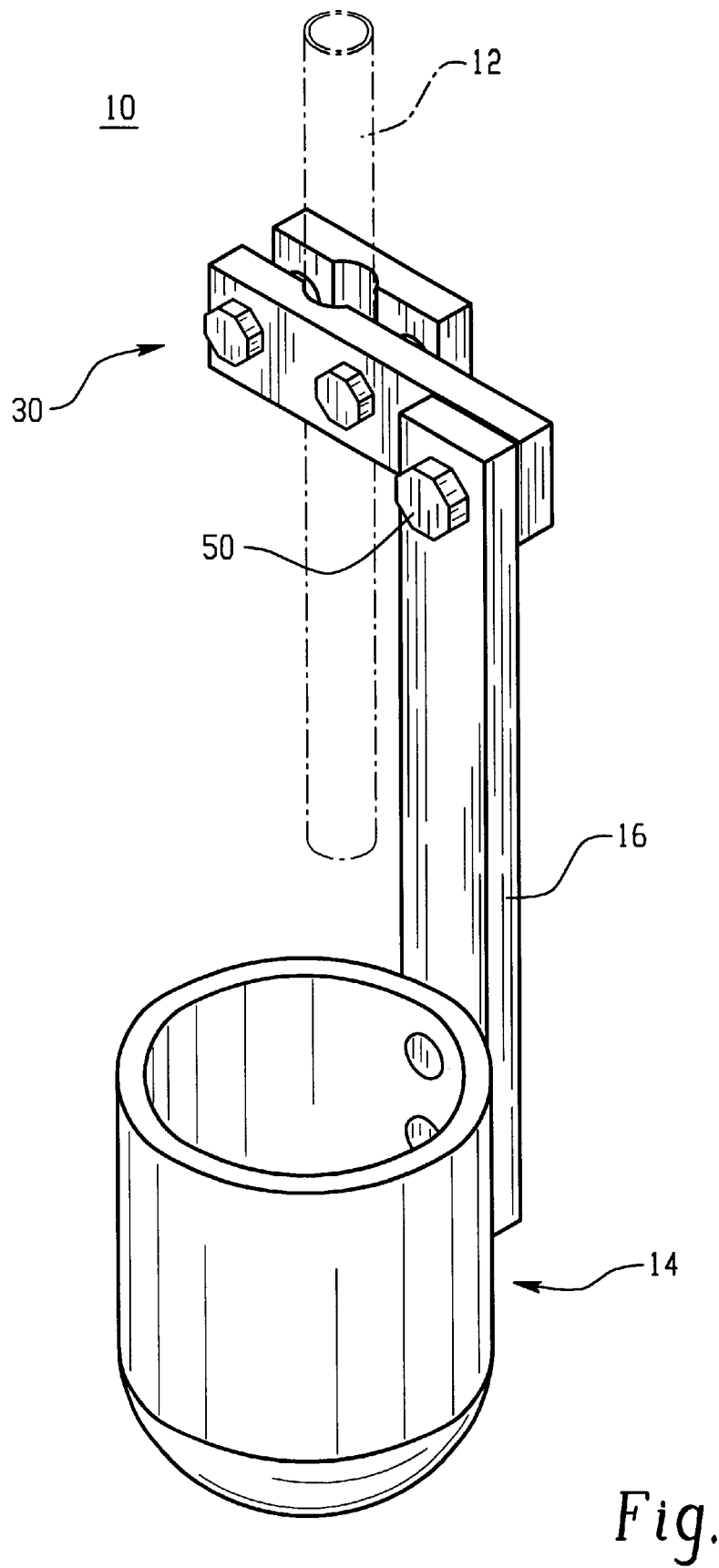
FIG. 4 is a perspective view of the pivotable beverage holder assembly shown in FIG. 3.

The cylindrical body 14 is an open top container that includes a base 16 and sidewalls 18 extending from the base 16. As shown in FIG. 2, the base 16 provides a generally concave interior bottom surface. An aperture 20 is centrally located in the base for permitting liquid to exit the cylindrical body, e.g., condensation, spillage, rainwater or the like. In a preferred embodiment, the cylindrical body 14 is machined or molded from a plastic material.

A pivot arm 16 is fixedly attached to the sidewall 18 of cylindrical body 14 and extends tangentially and substantially perpendicularly from the cylindrical body 14. The pivot arm includes an aperture 18 spaced apart from the cylindrical body 14. Preferably, the pivot arm 16 is fabricated from an aluminum metal.

In one embodiment, the means for securely attaching the pivot arm 16 to the framing member 12 includes a clamp 30. The clamp 30, as shown in FIGS. 1–4, includes a first holder 32 with a surface 33 for engaging the frame member 12 to be clamped, a second holder 34 with a surface 35 in opposition to the surface of the first holder 32, first and second tightening bolts 36, 38 and nuts 40, 42 spacedly attached to the first holder 32 and second holder 34 for fixedly securing the clamp 30 to the framing member 12. The surfaces 33 and 35 for engaging the framing member are shown having a radial recessed portion for securing the assembled clamp 30 to a cylindrical framing member 12. Other shapes and configurations will be apparent to those skilled in the art in view of this disclosure. The first holder 32 further includes an aperture 44 for securing the pivot arm 16 to the clamp 30.

The pivot arm 16 is attached to the clamp by means of a shoulder bolt 50 and nut 52. The shoulder bolt 50 includes an engageable head and a shaft. The shaft includes a smooth portion 54 extending from the head and a threaded portion 56. The shoulder bolt is inserted into apertures 18 and 44 and is fastened with nut 52 for pivotably attaching the open top cylindrical body 14 to the clamp 30. The smooth portion 54 of the shoulder bolt 50 permits the cylindrical body to pivot as shown in FIG. 2.

Figure 5:
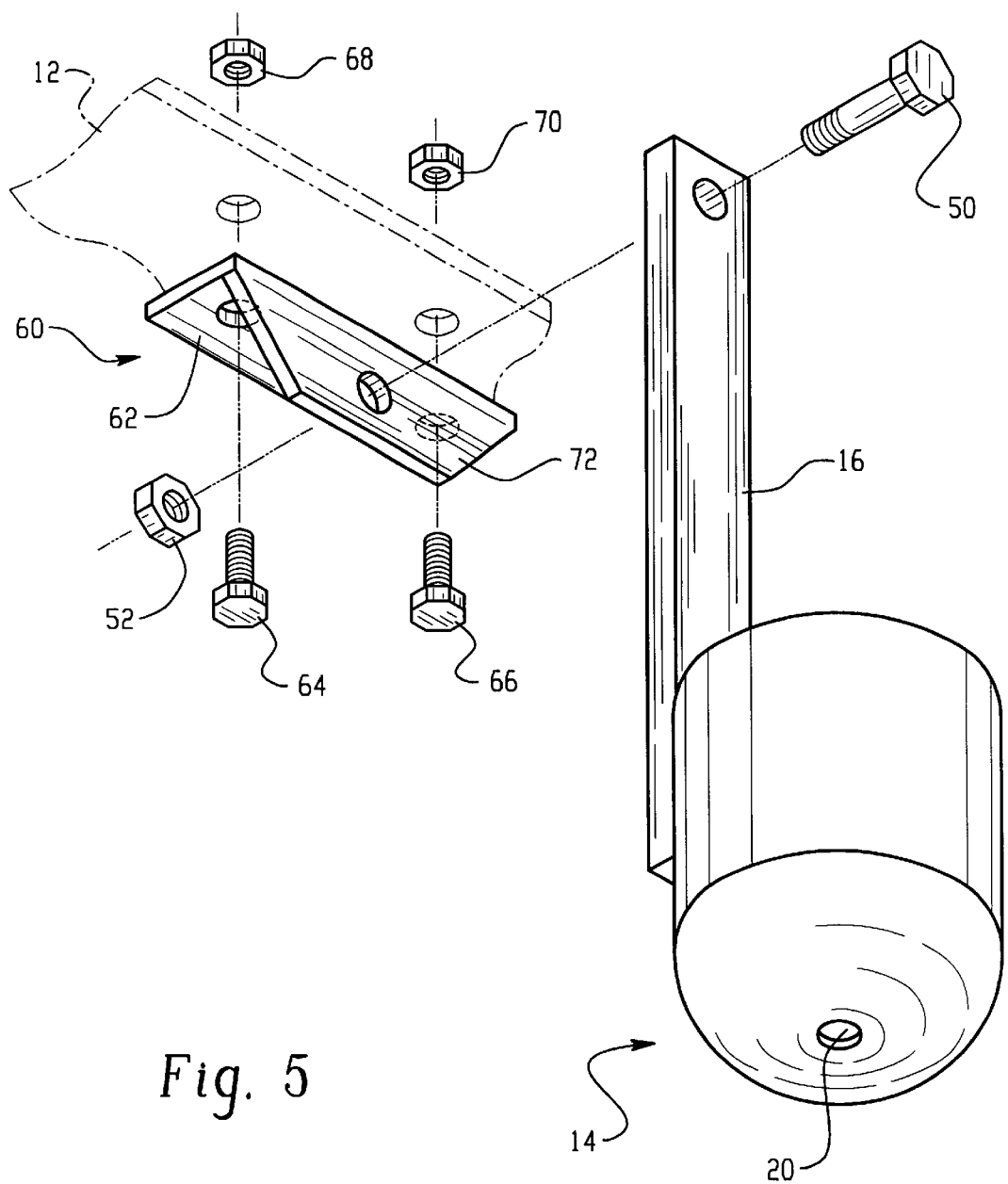
FIG. 5 is an exploded perspective view of the pivotable beverage holder assembly in accordance with an embodiment of the invention.
Figure 6:
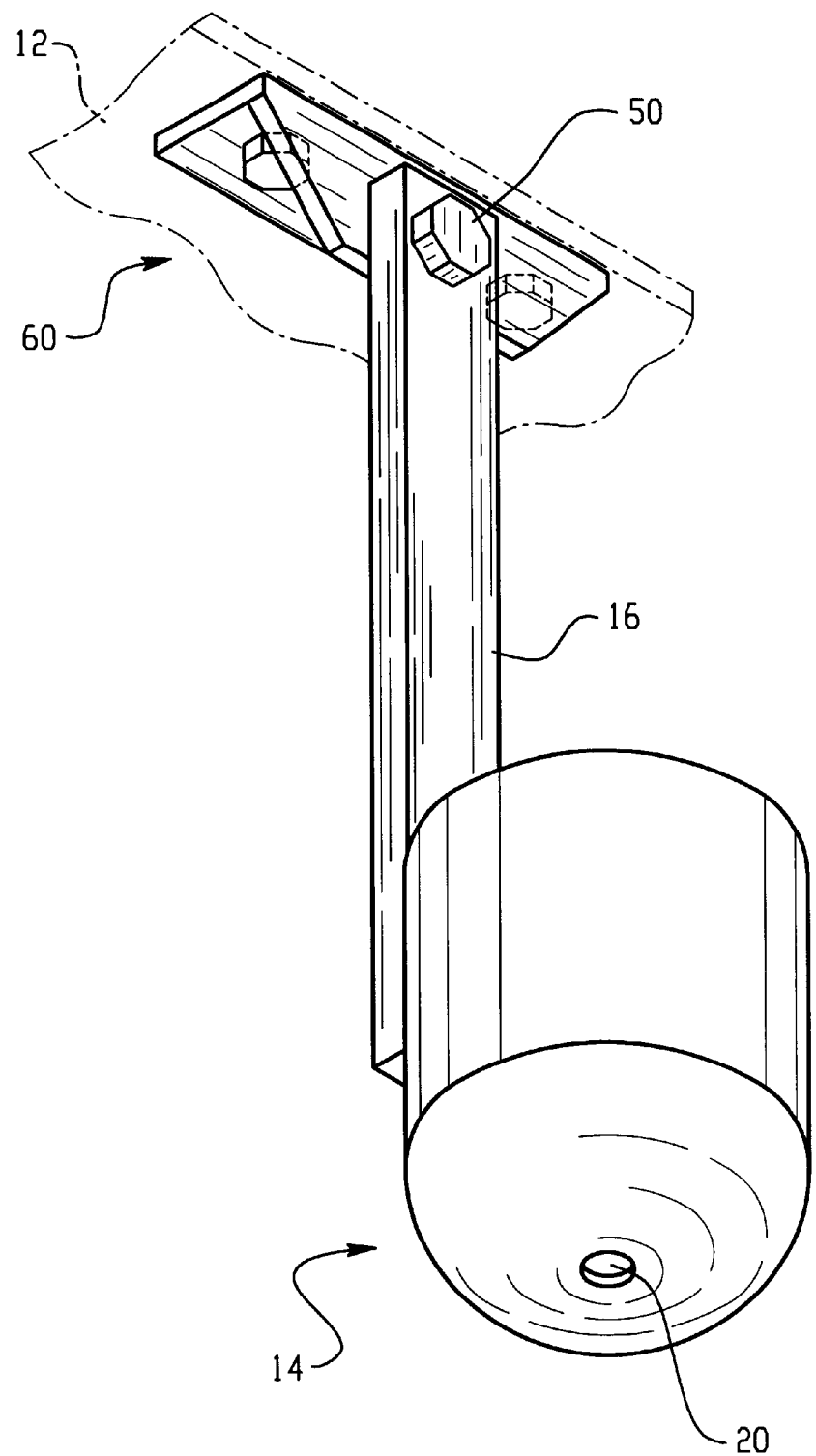
FIG. 6 is a perspective view of the pivotable beverage holder assembly shown in FIG. 5.

In a second embodiment, the means for securely attaching the pivot arm 16 to the framing member 12 includes an L shaped bracket 60, as shown FIGS. 5 and 6. The L shaped bracket includes two surfaces 62 and 72 perpendicularly oriented with respect to each other. One surface 62 is fixedly attached to a planar surface of the framing member 12 with first and second tightening bolts 64, 66 and nuts 68, 70. The other surface 72 includes an aperture 74 for securing the pivot arm 16 of the beverage holder assembly. The shoulder bolt 50 is inserted into apertures 18, 74 and fastened with nut 52.

The beverage holder assembly is a mounting device attached to a pivoting can holder. According to the foregoing, the advantages of the invention include at least the following:

1. Provides a convenient way for the golfer to transport a beverage on the golf course without physically carrying the beverage;
2. Provides an apparatus that prevents spilling of the beverage by automatically maintaining the beverage in an upright position over a variety of terrains;
3. Provides a beverage holder apparatus that is collapsible along with the golf cart for easy storage and transportation;
4. Provides a beverage holder apparatus that may be mounted on the right side or left side of the wheeled golf cart, thus allowing greater flexibility.
5. The clamp is adapted to surround a tubular or rectangular framing member that is part of the pull behind golf cart.

While preferred embodiments have been shown and described, various modifications and substitutions may be made thereto by one skilled in the art without departing from the spirit and scope of the invention. Accordingly, it is understood that the present invention has been described by way of illustration only, and such illustrations and embodiments as have been disclosed herein are not to be construed as limiting the scope of the claims.

What is claimed is:

1. A pivotable beverage holder assembly for mounting to a framing member, the beverage holder assembly comprising:

a clamp for attaching the assembly to the framing member, wherein the clamp consists of a first holder with a surface for engaging the frame member to be clamped, a second holder with a surface in opposition to the surface of the first holder, wherein the first holder being longer in length than the second holder first and second tightening bolts and nuts spacedly attached to the first holder and second holder for fixedly securing the clamp to the framing member, and a pivoting arm aperture in the first holder;

a shoulder bolt and nut, wherein the shoulder bolt includes a head and a shaft, wherein the shaft includes a smooth portion extending from the head and a threaded end portion; and a beverage holder portion including a cylindrical body having an open top portion and a rigid arm extending tangentially and perpendicularly from the cylindrical body, wherein the rigid arm includes an aperture at an arm end that is pivotably attached to the pivoting arm aperture of the first clamp holder with the shoulder bolt and nut, whereby the beverage holder assembly maintains open top liquid containers in an upright position despite changes in the orientation of the framing member.

2. The pivotable beverage holder assembly of claim 1, wherein the cylindrical body comprises a plastic material.

3. The pivotable beverage holder assembly of claim 1, wherein the first and second holder surfaces include a recessed portion adapted to be fixedly secured to a cylindrical framing member.

* * * * *